(12) United States Patent
Khanzode

(10) Patent No.: US 7,340,578 B1
(45) Date of Patent: Mar. 4, 2008

(54) METHOD AND APPARATUS FOR MAINTAINING AN ACCURATE INVENTORY OF STORAGE CAPACITY IN A CLUSTERED DATA PROCESSING SYSTEM

(75) Inventor: Anish R. Khanzode, Woburn, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 561 days.

(21) Appl. No.: 10/833,454

(22) Filed: Apr. 28, 2004

(51) Int. Cl.
*G06F 12/08* (2006.01)

(52) U.S. Cl. .................. 711/170; 707/200; 709/214; 711/156; 711/117

(58) Field of Classification Search .............. None
See application file for complete search history.

(56) References Cited

U.S. PATENT DOCUMENTS

| | | | |
|---|---|---|---|
| 6,895,485 B1 * | 5/2005 | DeKoning et al. | 711/170 |
| 6,973,491 B1 * | 12/2005 | Staveley et al. | 709/224 |
| 7,080,140 B2 * | 7/2006 | Heitman et al. | 709/224 |
| 7,080,229 B2 * | 7/2006 | Manbert et al. | 711/170 |
| 7,089,395 B2 * | 8/2006 | Jacobson et al. | 711/202 |

* cited by examiner

*Primary Examiner*—Gary Portka
(74) *Attorney, Agent, or Firm*—Dorsey & Whitney LLP

(57) ABSTRACT

In a networked computer system that includes clusters, each cluster is provided with a resource database and an agent that scans the systems in that cluster and collects storage resource details along with capacity information from the multiple systems that are members of that cluster. During the scanning process, this information is checked for completeness and integrity and stored in the resource database. Depending on the scan context, individual resources may be marked for reporting. The information in the database is then used to report consistent scan results back to the management or scanner software.

38 Claims, 13 Drawing Sheets

METHOD AND APPARATUS FOR MAINTAINING AN ACCURATE INVENTORY OF STORAGE CAPACITY IN A CLUSTERED DATA PROCESSING SYSTEM

FIELD OF THE INVENTION

This invention relates to clustered data processing systems and to methods and apparatus for maintaining accurate inventories of storage capacity and storage resources in such systems.

BACKGROUND OF THE INVENTION

In modern day computer systems, system availability and scalability are important problems. In particular, downtime that results from faults and scheduled maintenance often cannot be tolerated by many users. Further, many users desire computer systems that can expand as their businesses grow, so that they can protect their initial and subsequent investments in the systems.

One conventional method for solving both of these problems is to provide a computer system with "clusters." A cluster is a group of computers connected in such a way that they work as a single, continuously-available system. Generally, a cluster includes multiple servers, called "nodes" all connected to a set of network interfaces and to a set of storage resources. In a cluster, resources are made more available by redundancy. Typically, clusters use redundant servers, redundant interconnects, redundant networking, redundant storage and even redundant controllers and adaptors. The redundant resources permit processing to continue transparently if one or more hardware or software components of a cluster fails. In a failure situation, processing can continue uninterrupted by automatically switching processes to redundant working components in a process called "failover."

In addition to fault tolerance, planned downtime required for system maintenance can be greatly reduced in a cluster by transparently moving work from the node that needs maintenance to another node. Once the maintenance is performed, the work can be moved back to the original node. Clusters also provide a way to add capacity (performance and storage) to servers. The extra nodes help increase the server's throughput and storage capacity, so that growing demands can be met.

A typical networked system using clusters is illustrated schematically in FIG. 1. System 100 comprises many workstations, of which workstations 102 and 104 are illustrated. Workstations 102 and 104 are connected by a conventional network 106 to a number of servers. Server 108 is a standalone server and may be connected to the network 106 by a redundant connection 110. Servers 112 and 114 are clustered.

In particular, server 112 comprises two nodes 116 and 118 that are interconnected as illustrated schematically by connection 120. Each of nodes 116 and 118 is connected to storage resources 126 as indicated schematically by connection 122 for node 116 and connection 124 for node 118.

Similarly, server 112 comprises three nodes 130, 132 and 134 that are interconnected as illustrated schematically by connections 136, 138 and 140. Each of nodes 130, 132 and 134 is connected to storage resources 148 as indicated schematically by connection 142 for node 130, connection 146 for node 132 and connection 144 for node 134.

Software applications that run on a cluster are integrated with the cluster by means of "agents" (also called "data services.") An agent is a program that is written for a software application and which can start, stop and monitor the health of the software application. Agents are, in turn, controlled by resource group managers that monitor the state of the cluster. If a node fails, a resource group manager can stop an application running on that node and restart the application on another node.

While clustering provides advantages with regard to resource availability and scalability, it can complicate resource management. For example, in order to manage storage resources and storage capacity, it is necessary to generate an accurate inventory of all storage resources, such as disks, file systems, volumes, and volume groups, and their usage. In a clustered system, this can be done by scanning each cluster for resources associated with its nodes.

However, storage resources are often visible and available to multiple clusters. Alternatively, storage resources that are part of a cluster may only be visible to the nodes in that cluster. In addition, some resources, such as volume groups, aggregate, abstract and hide details of the resources contained within them and make these details unavailable to any system, including any cluster, from which they are visible. Other resources, such as disks, may be visible from a particular system, but not available to that system due to disk fencing techniques. Such a resource can be termed as visible, but unavailable.

In order to inventory storage resources and determine usage and unused capacity, management or scanner software scans the clusters to detect storage resources in two contexts: to collect resource information for shared resources in the cluster and to collect resource information for resources that are private to the cluster nodes. Depending on the context of the scanning process, the scan must collect only relevant resources and count each resource only once. However, because the same resources may be visible from several clusters, if the resources seen by all systems at all resource levels are counted, the resultant data will be inaccurate, typically over counting resource information in the inventory and overstating storage capacity and consumption information. Thus, it may be difficult to generate an accurate inventory of storage resources from any particular system or cluster.

SUMMARY OF THE INVENTION

In accordance with the principles of the present invention, instead of directly scanning each cluster with management software, each cluster is provided with a resource database and an agent that scans the systems in that cluster and collects storage resource details along with capacity information from the multiple systems that are members of that cluster. During the scanning process, this information is checked for completeness and integrity and stored in the resource database. Depending on the scan context, individual resources may be marked for reporting. The information in the database is then used to report scan results back to the management or scanner software.

In one embodiment, in order to avoid counting the same resource multiple times, each agent uses collectors to collect information about resources, whether the resources are shared or not, but the collectors identify each resource by means of a unique identifier so that when the resource is reported by multiple systems, the identifier will resolve to a single resource object.

In another embodiment, during the collection process, an agent identifies dependent resources along with their availability status. In situations where dependent resources are identified, but it is not possible to collect the relevant resource information for the identified resources because the resources are unavailable to the cluster with which the agent is associated, the agent identifies another system from which the resource information can be obtained. If the other system is another cluster, the agent then contacts an agent associated with that cluster to obtain the information. Once the information is obtained, it is merged into the database.

In still another embodiment, during the collection process, each resource in the database is marked to indicate whether that resource will be reported to management or scanner software that is inventorying the resources. Resource information which is of no interest to the collection process is marked as not reportable, so that the information is not reported. The decision to mark a resource for reporting is based on the scan context (whether the scan is being conducted for cluster-wide shared resources or resources private to a member of the cluster) and whether the resource is private to a member or shared by a cluster.

In another embodiment, at the end of the scanning process, the resource information is checked for completeness based on the level of the resource in the resource group hierarchy. For example, if a volume group resource has been marked for reporting, the volume and disk resources contained in the volume group are checked to insure that they are also marked for reporting.

In yet another embodiment, also at the end of the scanning process, the resource information is checked for integrity. In particular, resources in a group and the group itself are checked to make sure that both the resources and the group containing them are consistently marked. For example, if a disk is marked to be reported and that disk is contained in a volume group, then the volume group is checked and also marked to be reported.

BRIEF DESCRIPTION OF THE DRAWINGS

The above and further advantages of the invention may be better understood by referring to the following description in conjunction with the accompanying drawings in which.

DETAILED DESCRIPTION

Figure 1:
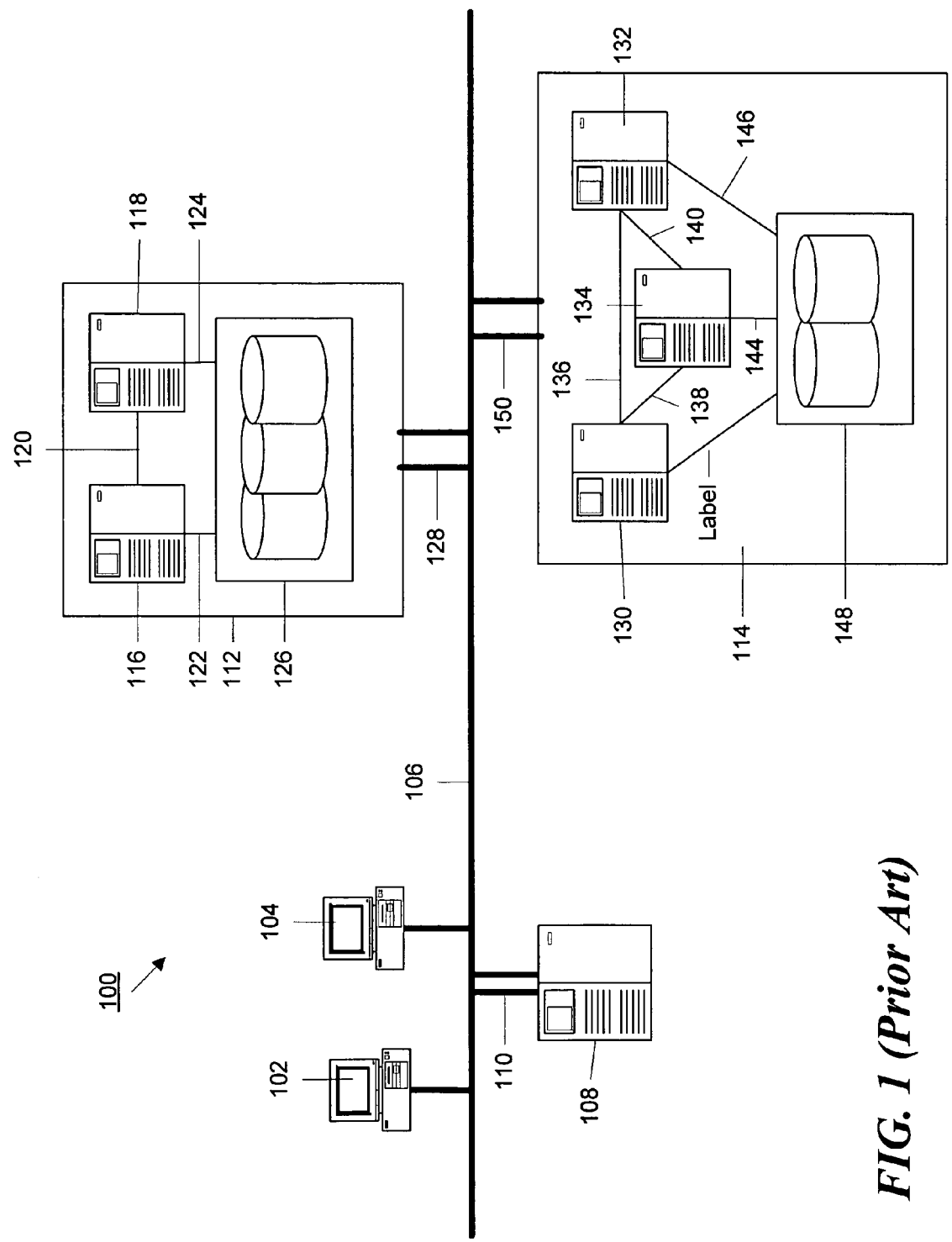
FIG. 1 is a block schematic diagram illustrating a conventional networked computer system that includes clusters.
Figure 2:
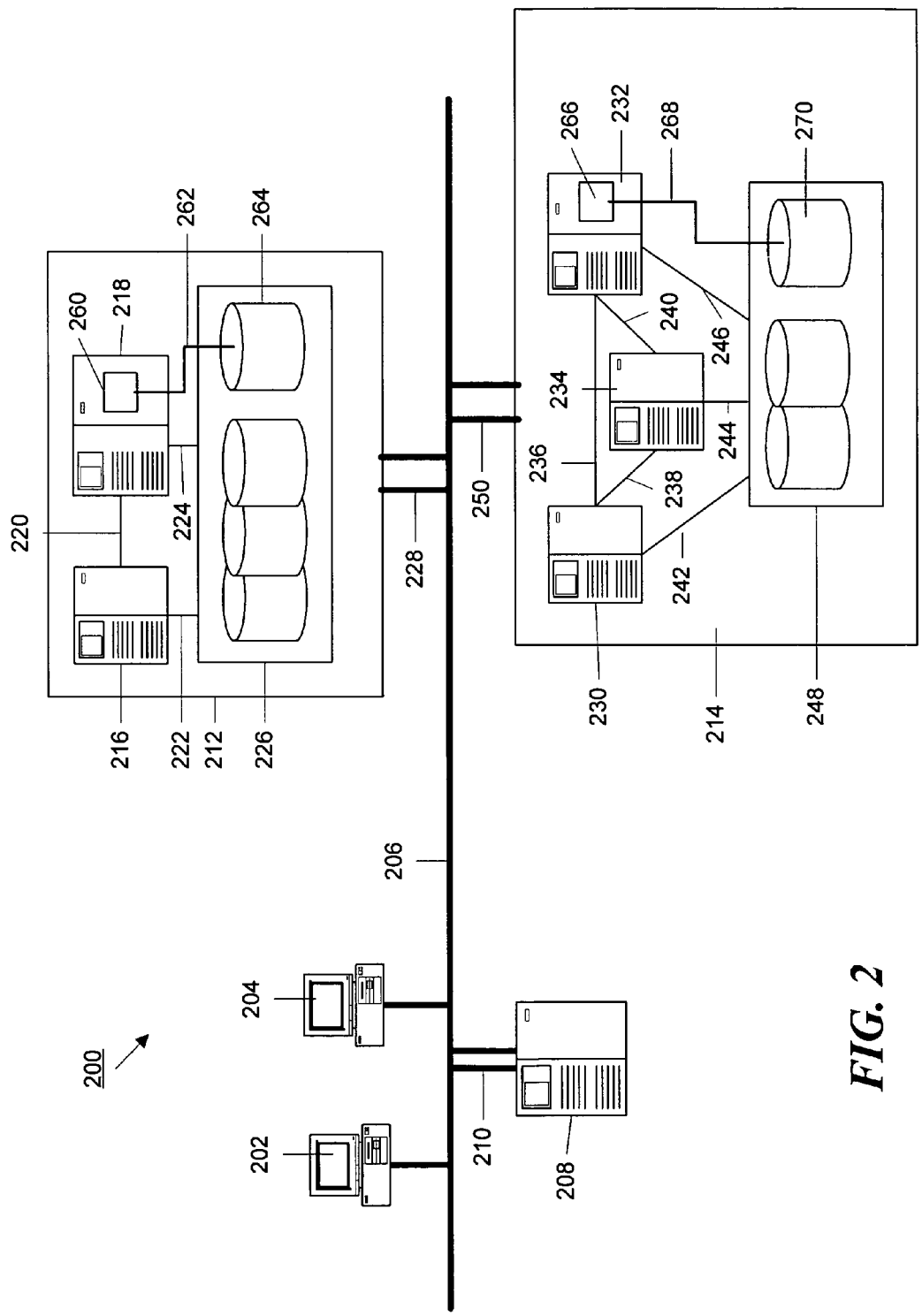
FIG. 2 is a block schematic diagram that illustrates the system of FIG. 1 in which a resource database and an accompanying agent is associated with each cluster.

FIG. 2 is a block schematic diagram of the clustered system shown in FIG. 1 with agents and resource databases added in accordance with the principles of the invention. In FIG. 2, elements that correspond to elements in FIG. 1 have been given corresponding numeral designations. For example, workstation 102 in FIG. 1 corresponds to workstation 202 in FIG. 2. Elements in FIG. 2 that have corresponding elements in FIG. 1 also have corresponding descriptions which will not be repeated.

Each of the clusters 212 and 214 has an agent and an associated resource database. For example, cluster 212 has agent 260 running in host 218. Although agent 260 is shown running in host 218, in accordance with conventional cluster operation agent 260 could run in either host 218 or host 216. Agent 260 communicates with associated resource database 264 as indicated schematically by arrow 262. Similarly, agent 266 is associated with cluster 214. This agent 266 is illustrated as running in host 232, although agent 266 could also run in any of hosts 230, 232 or 234. Agent 266 communicates, as indicated schematically by arrow 268, with database 270.

Figure 3:
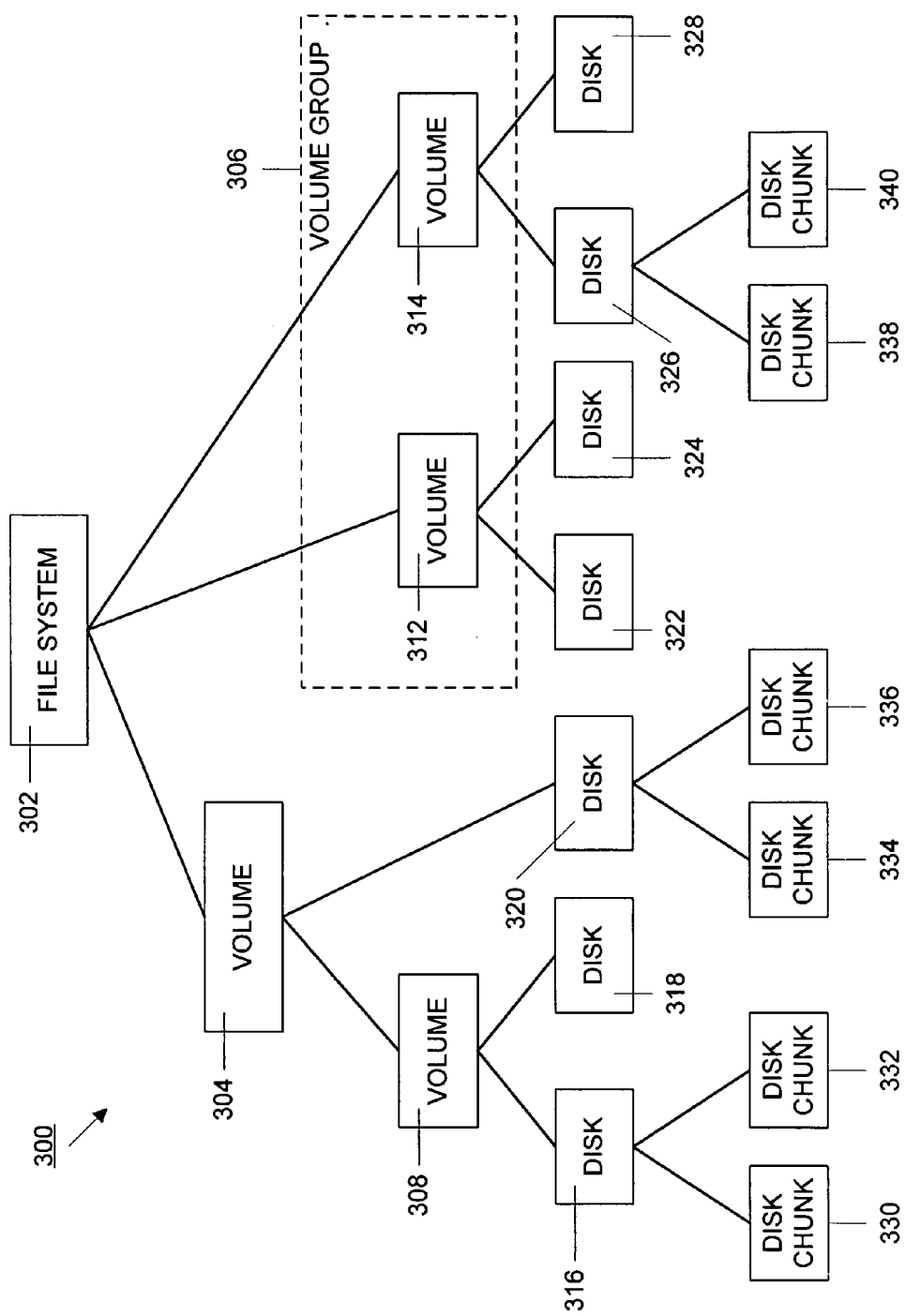
FIG. 3 is a resource type hierarchy diagram illustrating how resource types are arranged as a hierarchy or stack in which resources types at lower levels are included in resource type at higher levels.

A typical cluster may have storage resources of various types. These types could include. For example, file systems, volume groups, volumes, disks and disk "chunks", which are sections of a single disk. The storage resource types are commonly organized in a multi-level hierarchy or "stack" in which resource types in lower levels are included in resource types in higher levels. FIG. 3 illustrates an exemplary resource type hierarchy 300. The particular levels shown in this diagram as well as the number and distribution of the resources at each level are dependent on the particular computer system. Accordingly, different computer systems may have different types and distributions of resources than those shown in FIG. 3. In the illustrative hierarchy 300 shown in FIG. 3, the highest resource type level is the file system 302. Each file system commonly exists on one or more volumes, of which volumes 304, 312 and 314 are illustrated in FIG. 3. Some volumes may be part of a volume group. For example, as illustrated in FIG. 3, volume group 306 includes volumes 312 and 314. The significance of a volume group is that all volumes in the group reside on a single node in the system.

Each volume is comprised of other volumes and/or disks. Illustratively, volume 304 includes volume 308 and disk 320; volume 308, in turn, includes disks 316 and 318; volume 312 includes disks 322 and 324 and volume 314 includes disks 326 and 328. Each volume may include any combination of other volumes and disks. Each disk may also include one or more disk "chunks" each of which is a slice of the same disk. Illustratively, disk 316 may include disk chunks 330 and 332, whereas disk 320 includes disk chunks 334 and 336. Similarly, disk 326 includes disk chunks 338 and 340.

By using scanning processes that are described in detail below, each agent collects information on the storage resources in its associated cluster along with capacity information and stores this information in the resource database with which it communicates. An agent always collects all of the resource information discovered in the scanning process and stores it in the resource database whether or not the information will eventually be reported to management or scanning software. However, only information that is relevant in the context of the scan is actually reported back to the management or scanning software. Before sending the relevant resource information to the management software, its reportability and integrity can be resolved using the information stored in the database.

Figure 4:
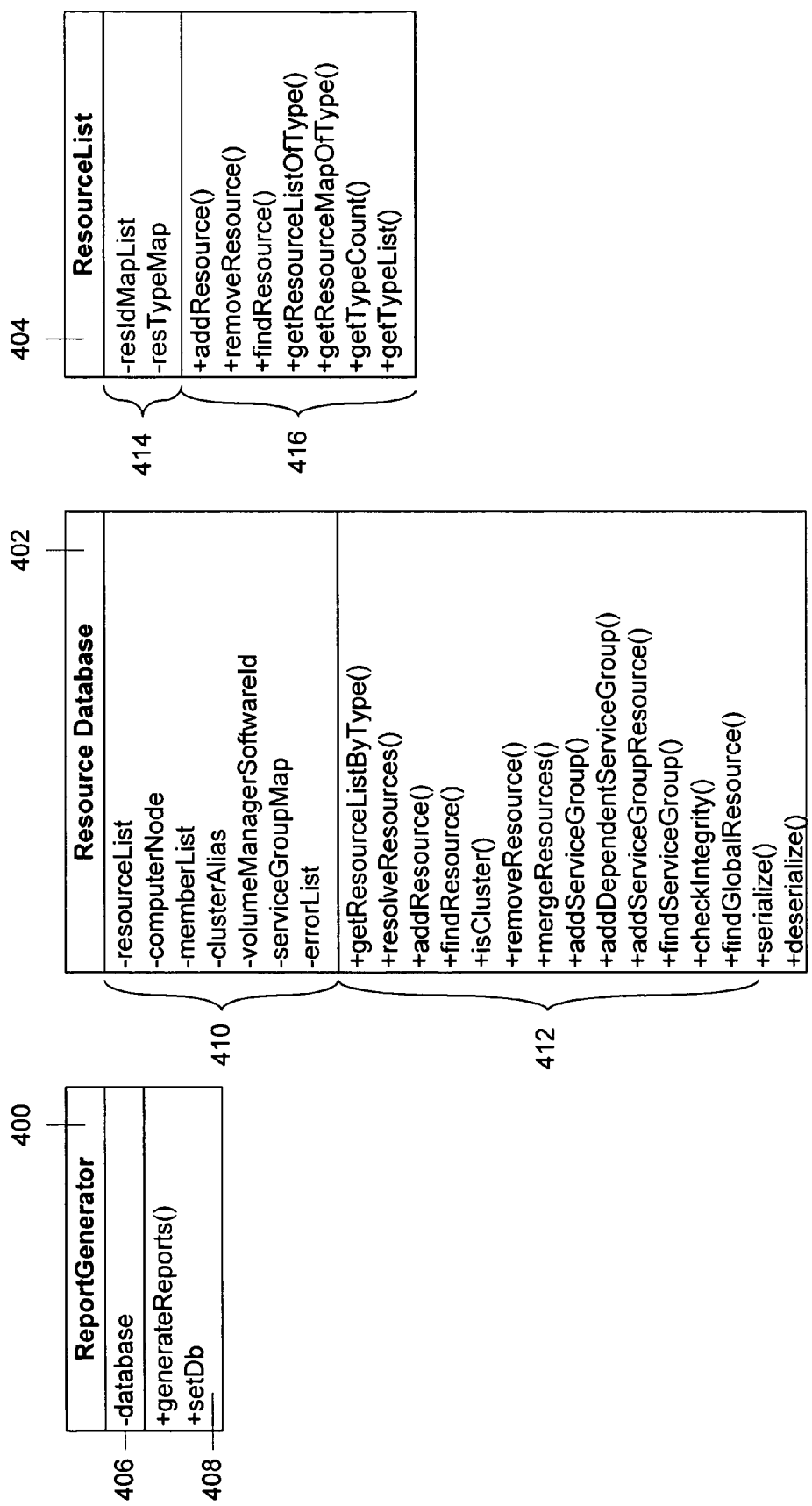
FIG. 4 is a class diagram illustrating the attributes and methods of a report generator class, a resource database class and a resource list class from which the corresponding objects can be instantiated.

In one embodiment, each resource database is comprised of a number of object-oriented objects. Classes for instantiating three main objects are illustrated in FIG. 4. These classes include a ReportGenerator class 400, a ResourceDatabase class 402 and a ResourceList class 404. The ReportGenerator class 400 has attributes 406 that include a database reference to the resource database object that will be used to generate a requested report. The class methods include a generateReports( ) method that can be called by management/scanner software to return an accurate list of resources and capacity and a setDb( ) method that can be used to set the database reference attribute to reference the appropriate ResourceDatabase object.

The ResourceDatabase class 402 can be used to instantiate a resource database object, which comprises the principal repository of resource information. Class 402 has attributes 410 that include a resourceList object, which, in turn, holds a list of resource objects, a computerNode attribute that identifies the host computer on which the associated agent resides and a memberList attribute that comprises a list of the members in the associated cluster. Further attributes include a clusterAlias attribute that holds a host name common to all hosts associated with the cluster and a volumeManagerSoftwareId attribute that identifies the volume manager software for a volume manager operating in the associated cluster. A serviceGroupMap attribute contains a list of service groups in the associated cluster. Finally, an errorList attribute maintains a list of possible errors.

ResourceDatabase class 402 also includes various methods 412 that can be used to manipulate the resource information. These methods include methods for adding (addResource( )), removing (removeResource( )), finding (findResource( )) and merging resources (mergeResources( )) into the database resource list. Similar methods are provided to add a service group (addServiceGroup( )), find a service group (findServiceGroup( )), adding a dependent service group (addDependentServiceGroup( )) and adding service group resource (addServiceGroupResource( )) to the database resource list. A getResourceListByType( ) method obtains a list of resources all of which are of a specified type. The findGlobalResource( ) method can locate a particular resource. A checkIntegrity( ) method is also used, as will be discussed below to check the integrity of the database to insure that the resource objects corresponding to resources that are listed as included in a resource group actually exist in the database. A resolveResources( ) method can be used to insure that hierarchical resources are consistently marked for reporting purposes, as will be discussed below. An isCluster( ) method can be used to determine whether the resource database is associated with a cluster or a standalone system.

The serialize( ) method is used to read and stream the contents of the database for administrative purposes, such as backing up the files. The deserialize( ) method is also used for administrative purposes, for example, to restore backed up information.

A class 404 that can be used to instantiate resourceList objects, such as that included in the ResouceDatabase object is shown in FIG. 4. Class 404 comprises attributes 414 that include a resource ID map list (resIdMapList) that contains a list of resource object IDs and a resource type map (resTypeMap) attribute that contains a list of resources by type. Methods 416 are provided to manipulate the resources in the map list and type list. These include methods for adding resources (addResource( )), removing resources (removeResource( )), finding resources (findResource( )) and getting resource list and maps of specified types (getResourcesListOfType( ) and getResourceMapOfType( ), respectively). A getTypeCount( ) method can be used to obtain a count of resources of a specified type. Finally, a getTypeList( ) can be used to obtain a list of resources of a specified type.

Each resource is represented by an object that maintains various attributes of the resource, in particular, the type and the capacity, if appropriate. Similarly, each service group is also represented by a service group object. A service group comprises a collection of resources that are configured in the current cluster. The service group object also captures a list of systems that are members of clusters where the service group resources are available and can failover in case of a node failure in the current cluster.

Figure 5:
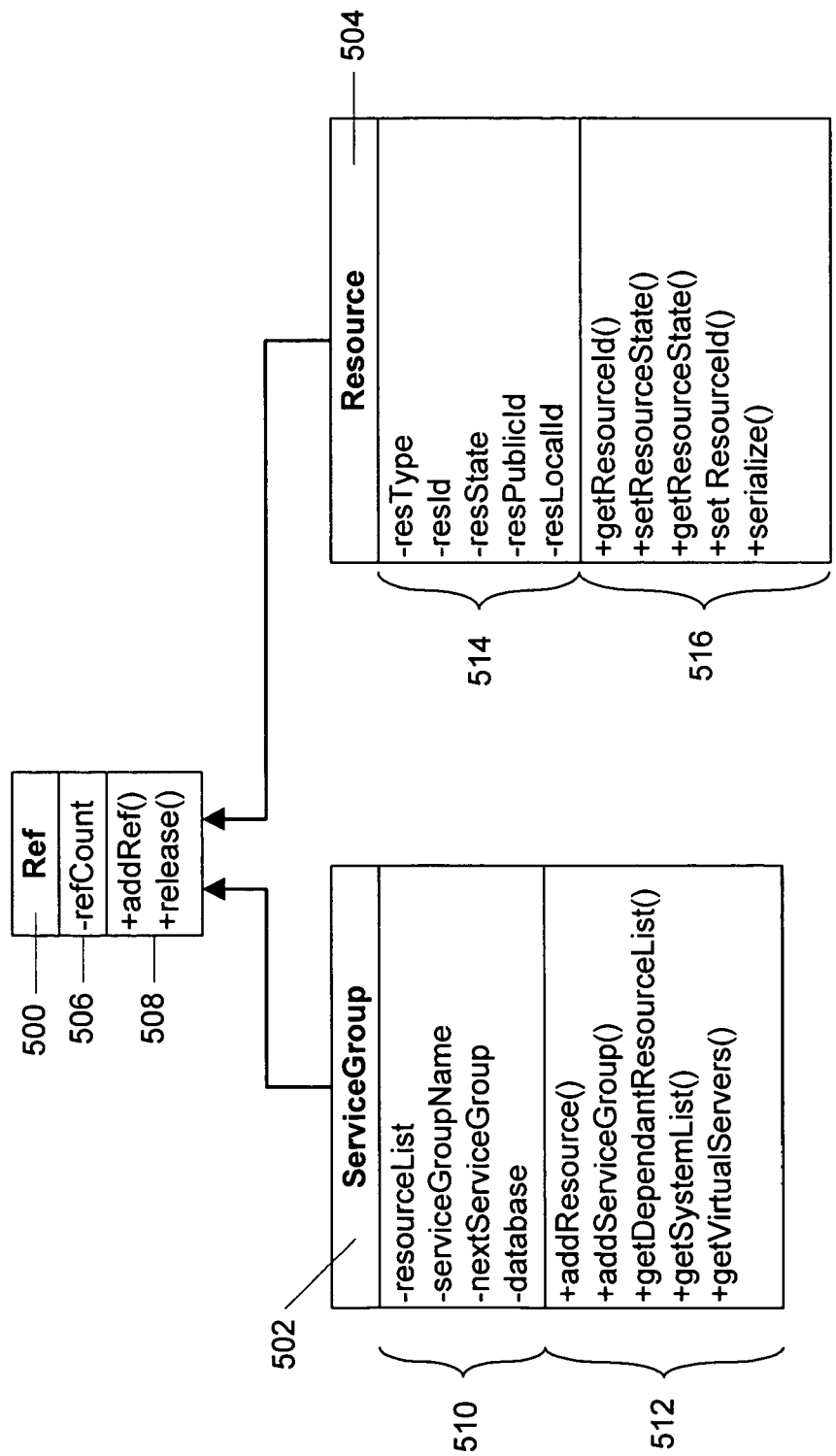
FIG. 5 is a class hierarchy diagram illustrating how a service group sub-class and a resource sub-class are sub-classed from a reference class.

Classes from which these latter objects can be instantiated are illustrated in FIG. 5. The serviceGroup class 502 and the Resource class 504 are both sub-classed from a Ref class 500 that provides each object with a reference count. The Ref class has a count attribute 506 (refCount) that indicates the number of references to that object. Each other object that references the object in question calls the addRef( ) method to increase the reference count. When another object deletes a reference to the object in question, it calls the release( ) method which decrements the reference count. When the reference count reaches zero, the object in question is deleted. This automatically removes unused objects.

The ServiceGroup sub-class 502 has various attributes 510 including a resourceList attribute that lists all of the resources configured in the cluster for that service group. Other attributes include the service group name (serviceGroupName) and an attribute identifying another service group in the cluster (nextServiceGroup).

Service group methods include methods for adding resources to the service group (addResource( )) and adding a service group to the list (addServiceGroup( )). A getDependentResourceList( ) method obtains a list of resources that are dependent on other resources. The getSystemList( ) method obtains a list of member systems in which the service group resources are available, as mentioned above. The getVirtualServers( ) method returns a list of virtual servers associated with the service group.

Each resource is represented by an object instantiated from a sub-class of the Resource class 504. This class has various attributes 514 including the resource type (resType) and the unique resource ID (resId) previously mentioned. The Resource class attributes further include a state attribute (resState) which is a bitset containing bits that represent various conditions associated with the resource. One bit is a reporting bit. Setting this bit causes the resource to be reported and clearing it causes the resource not to appear on a report list. Each resource also has a public ID (resPublicId) and a local ID (resLocalId). Methods 516 include methods to set the resource state and ID and to read these values. The serialize( ) method marshals the contents of the resource object and prepares them for administrative purposes, such as backing up file information.

Figure 6:
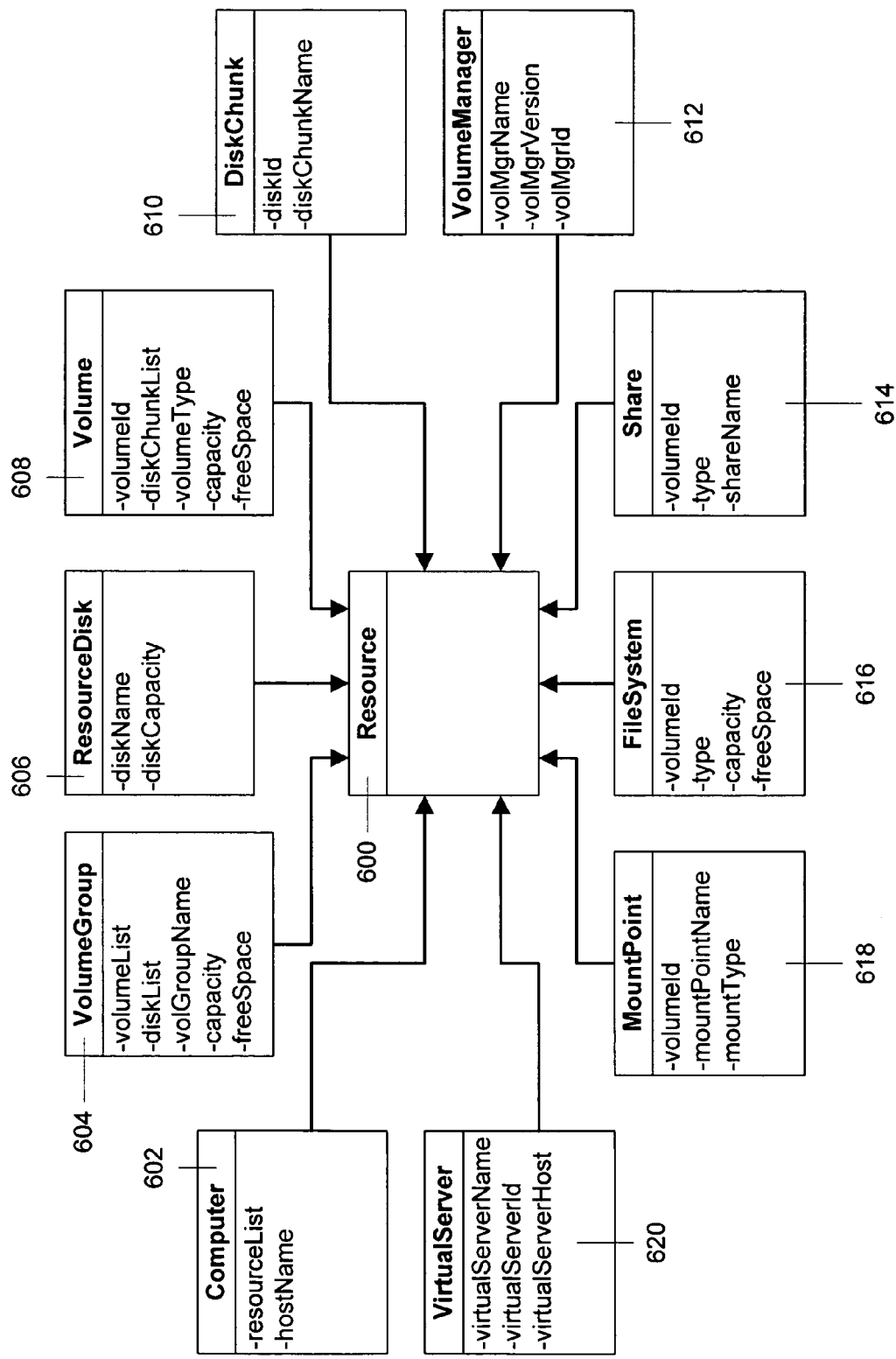
FIG. 6 is a class hierarchy diagram illustrating various resource object sub-classes that are sub-classed from the resource class.

Each host computer and each different type of resource is represented by an object that is instantiated from a sub class of the Resource sub-class. For an exemplary resource type hierarchy such as that shown in FIG. 3, these subclasses are illustrated in FIG. 6 as sub-classed from Resource class 600. As would be obvious to one skilled in the art, if the storage hierarchy includes resource types other than those shown in FIG. 3, then a sub-class of the Resource sub-class must be created for each other resource type. In FIG. 6, details of the Resource sub-class 600 have been omitted for clarity. A separate subclass is provided for each resource type and each sub-class typically includes attributes specific to that resource type. The attributes may include information identifying selected characteristics of the resource and its capacity, if relevant. These classes include a Computer sub-class 602 that represents a host computer. Typical attributes for a host computer might include a resource list (resourceList). This resource list would include all resources that are visible to the computer represented by the computer resource object. Other attributes can include the host name and other important parameters, such as RAM size and free space, processor speed, address space size, operating system information, IP address, etc. These latter attributes have been omitted from FIG. 6 for clarity. In addition, conventional straightforward methods, such as set( ) or get( ) methods, have also been omitted.

A VolumeGroup sub-class can be used to instantiate an object that represents a volume group. This group includes a list of volumes in the group (volumeList) and a list of disks in the group (diskList). The attributes also include the capacity (capacity) and free space (freeSpace) of the volume group. Other attributes (not shown in FIG. 6) could include status codes and descriptions. Various methods (not shown in FIG. 6) could also include methods for adding volumes and disks to the group.

The ResourceDisk sub-class 606 can instantiate an object that represents a disk. Attributes include the disk name (diskName) and capacity (diskCapacity) and may include other attributes (not shown in FIG. 6) such as model number, serial number, defects, disk RPM, version and status codes.

A volume is represented by an object instantiated from the volume class 608. This class has attributes, such as the volume ID (volumeId), the volume type (volumeType) and a list (diskChunkList) of disk "chunks" or disk sections that make up the volume. Other attributes can include the volume capacity (capacity) and volume free space (freeSpace). Still further attributes (not shown in FIG. 6) can include vendor information, status information and hierarchy type.

Each disk chunk that is part of a volume is itself represented by an object instantiated from the disk chunk class 610. This class has attributes that include the disk chunk name (diskChunkName) and the ID of the disk on which the chunk is located (diskId). Other attributes (not shown in FIG. 6) can include the start location and length of the chunk.

The VolumeManager class 612 can be used to instantiate an object that represents a volume manager associated with the cluster. Attributes of this class include the name (volMgrName), version (volMgrVersion) and ID (volMgrId) of the volume manager.

A shared volume is represented by an object instantiated from the Share class 614. The attributes of this class include the Id of the shared volume (volumeId) and the type and name of the sharing arrangement (type and shareName, respectively). Additional attributes can include path, user and domain names.

A file system is represented by an object instantiated from the FileSystem Class 616. The attributes of this class include the ID of the volume in which the file system resides (volumeId), the type (type), the capacity (capacity) and free space (freeSpace) of file system. Other attributes might include an indication if whether the file system is compressed or encrypted and the actual and maximum file counts and file sizes.

The MountPoint class 618 can be used to instantiate an object that represents a volume mount point. Its attributes include the ID of the volume (volumeId) that is being mounted, via the mount point, the mount point name and type (mountPointName and mountType, respectively). Additional attributes might include the computer to which the volume is mounted and an indication as to whether the volume should mount automatically at system startup.

The VirtualServer class 620 can be used to instantiate objects that represent virtual servers in the cluster. This class includes attributes such as the server name (virtualServerName), the server ID (virtualServerId) and the host name (virtualServerHost).

In order to accurately inventory resources and their capacity, management software can request that an agent perform a resource collection scan. In a cluster environment, during a collection scan, resources are collected from the multiple systems which are members of the cluster and are added to the resource database. In some cases two different clusters share resources. If details of resources are needed from member systems of other clusters, they are also requested and merged into the resource database. After the collection process is complete, the resource database contains the resource information of the cluster shared resources and the cluster member private resources.

Even though information for all resources is collected, not all resources are reported to the management software. Whether a resource is reported or is not reported is determined based on the context of the scan and whether the resource is private or shared by the cluster. For example, in a standalone system configuration, all the resource information is marked to be reported. In a clustered system, the scan context decides which resource information should be marked for reporting. In particular, the scan can be conducted for cluster-wide shared resources or only for resources that are private to a member of the cluster. For example, in a cluster alias scan, only shared resources are marked for reporting. In a member scan, only resources that are local to that member are marked for reporting.

In addition, once the resource database is populated and marked for reporting, a resolve resources process can be run to update the reportability of each dependent resource based on the level of that resource in the resource type hierarchy. In particular, if a resource at one level of the resource type hierarchy is marked to be reported, then all lower level resources that are included in the marked resource are also marked to be reported. For example, if a volume group resource includes a volume and a disk, and the volume group is marked to be reported, the resolve resources process checks to make sure that the dependent resources (in this case, the volume and the disk) are also marked to be reported and marks them to be reported if they are not so marked.

Lastly, before sending the report to the scanner/management software, the integrity of the objects marked to be reported is checked. This ensures that no dependent resource is left unreported because a resource type at a higher level is not marked to be reported. For example, if a disk is marked to be reported but a volume group object that contains that disk is not marked to be reported, the integrity check process will mark volume group object for reporting to the scanner/management software.

Figure 7A:
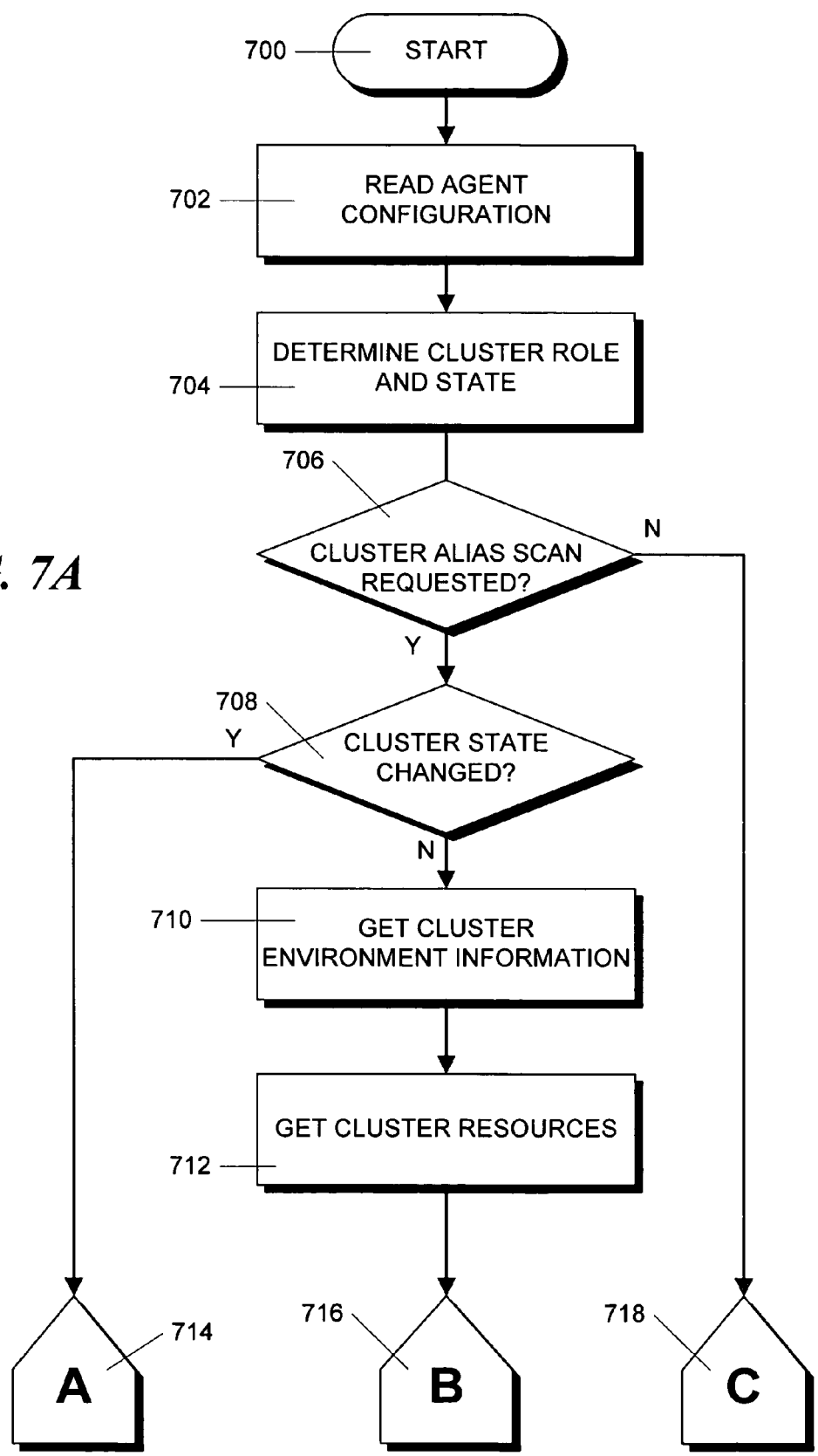
FIGS. 7A and 7B, when placed together, form a flowchart illustrating the steps performed by an agent during a cluster alias scan that detects resources that are shared cluster-wide.
Figure 7B:
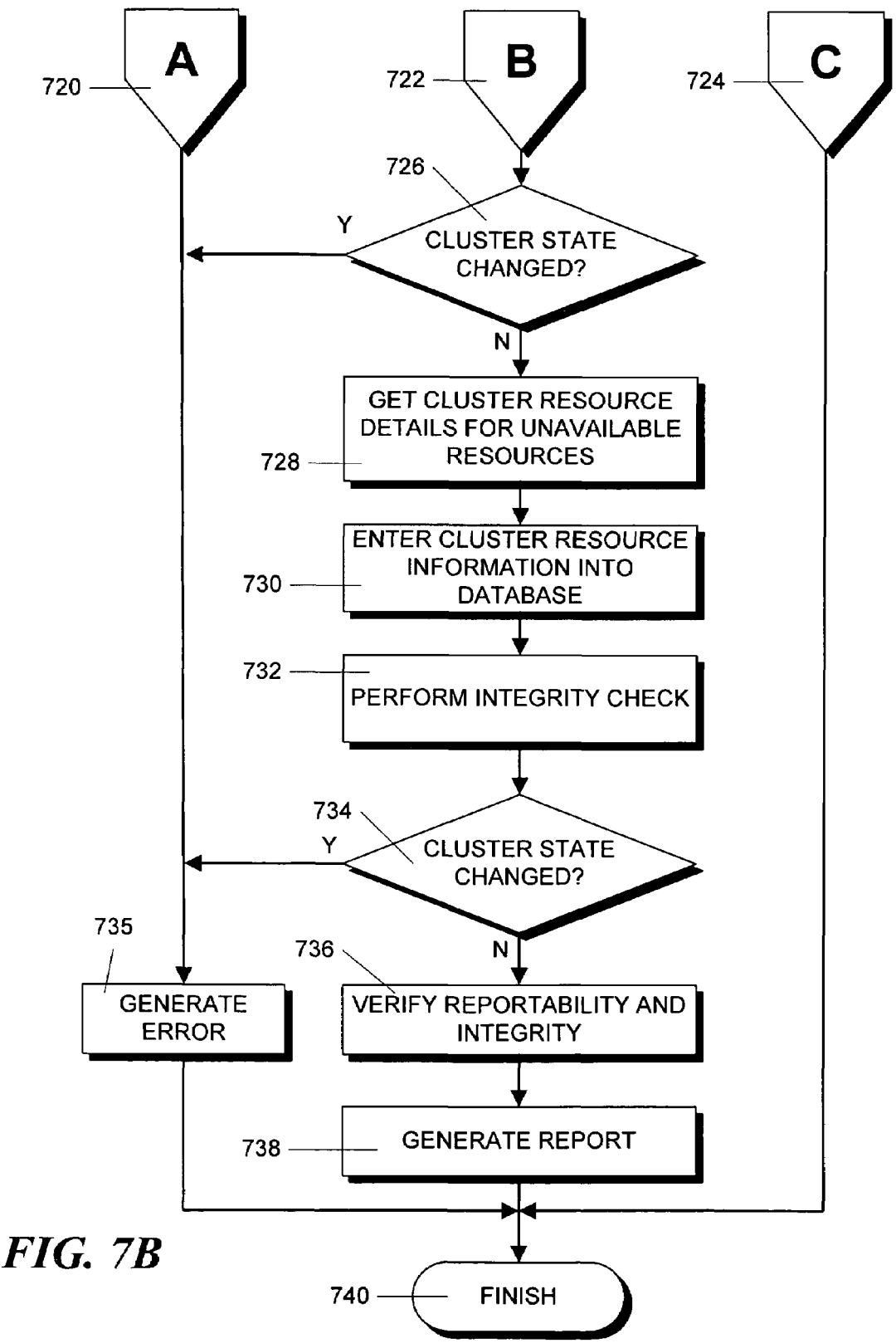

FIGS. 7A and 7B, when placed together form a flowchart showing the steps in an illustrative process performed by an agent during a "cluster alias" resource collection scan in which the associated cluster is scanned for shared resources. This process begins in step 700 and proceeds to step 702 where the agent reads a configuration file in order to configure itself. This configuration file typically includes a list of collection programs that will be loaded and their respective locations. These collection programs will later be used to locate and identify the cluster resources. In order to maintain a consistent view of storage resources, it is important that the collection programs used to obtain the resource information consistently and unambiguously identify each resource with a unique identification. While different resource types may be assigned the same identification, all resources of a specific type must have unique identifications, typically a unique resource ID number or string.

In step 704, the agent determines the cluster role and state by interrogating the controlling node of the cluster using appropriate system calls and utilities or other information collectors. The exact collection mechanism used to obtain this information will vary from system to system and is dependent on the node identified by the agent. Next, in step 706, the agent determines if a cluster alias scan has been requested by management software or by another means. If not, the process proceeds, via off-page connectors 718 and 724 to step 740, where the process terminates.

Alternatively, if in step 706, it is determined that a cluster alias scan was requested, then, in step 708, a determination is made whether the cluster state has changed. This determination is made by examining a cluster checksum that is maintained by the controlling node. Any changes in the cluster configuration or state are reflected by a change in this checksum. If the cluster state has changed, as indicated by a change in the checksum, then the resource database may be inconsistent or may not reflect the changes. In this case the process proceeds, via off-page connectors 714 and 720, to step 735 where an error is generated to the management or scanning program. The process then finishes in step 740 and it will be necessary for the scanning program to restart the scanning process.

Alternatively, if in step 708, it is determined that the cluster state has not changed, then, in step 710, the environment information, including general cluster information, is obtained, again by using appropriate system calls and utilities addressed to the controlling node in the cluster. The environment information can include the cluster alias name, the node host name and node details and volume manager information. The information can also include the node count for the cluster and information concerning the other member nodes. When this information is obtained, it is entered into the resource database.

The mechanism for entering the information into the database depends on whether the information presently exists in the database. The existence of the information in the database can be determined by using a method call, such as the findResource( ) method of the ResourceDatabase object, which takes as a parameter the resource type and the unique resource ID. If an object already exists in the database for this resource, then the existing resource object is updated by using a method call, such as the mergeResources( ) method call of the ResourceDatabase object. The mergeResources( ) method may add new information or selectively overwrite existing information. If the information does not already exist in the database, then a new object for the resource can be instantiated from one of the sub-classes by calling an appropriate method, such as the addResource( ) method of the ResourceDatabase object and passing in the resource type and unique ID.

For example, a Computer object for the controlling node can be instantiated from the computer sub-class 602. The appropriate attributes are then set in this new computer object. Computer objects can also be instantiated for each of the nodes in the cluster. Similarly, a volume manager object is instantiated from the VolumeManager class 612 and the appropriate attributes are set.

Since a cluster alias scan has been requested, as information for shared resources is collected the resource objects that are created or merged are marked for reporting. In particular, in one embodiment, each resource is marked for reporting by setting an appropriate bit in the state attribute for the resource.

Next, in step 712, the cluster resources are obtained by loading and using the aforementioned collection programs. The collection programs interrogate each member system in the cluster and obtaining information regarding the resources that are visible to it and available to it. First all cluster resources, including disks, file services, volumes and volume groups are obtained. This information may be obtained from utilities that are specific to the computer system. For example in computer systems developed and sold by Sun Microsystems, Inc., information for storage resources, such as disks, can be obtained from disk identification daemons. Information for resources, such as volume groups and volumes can be obtained from volume manager programs running on the cluster. Similar utilities can be used to obtain information on other resources. As mentioned above, the collection programs are constructed to uniquely and unambiguously identify each resource and assign that resource a consistent and unique (with respect to resource type) resource ID. The unique resource ID assures that the resource will be included only once in each report and prevents resource over counting.

As each resource is located and information for that resource is obtained, the information is entered into the database, either by updating existing information or by instantiating a new resource object from the appropriate resource sub-class as described above. Also, as described above, as information for each resource is obtained, the corresponding resource object is marked for reporting, for example, by setting the appropriate bit in the resource state attribute.

Also, in the process of obtaining cluster resources, additional information is obtained concerning all service groups and their dependent resources and all virtual servers. As with the other resources, this information is entered into the resource database.

The process then proceeds, via off-page connectors 716 and 722 to step 726, where another check is made to determine if the cluster state has changed. Again this determination is made by examining the cluster checksum. If the cluster state has changed, the process proceeds to step 735 to generate an error to the calling program and then finishes in step 740. If, in step 726, it is determined that the cluster state has not changed, then the process proceeds to step 728 in which cluster resource details for resources that are visible, but not available, are obtained. These resources, for example, might be resources that are part of other clusters, but are available to the current cluster. First, a list is compiled of all resources which are visible, but for which details are unavailable. For each resource on the list, the service group in the current cluster to which the resource belongs is examined. The service group details allow the agent to select a remote agent in another cluster from which the details can be obtained.

Then, the agent for the current cluster contacts the remote agent in the other cluster and requests details concerning the resource for which details are not available.

Figure 8:
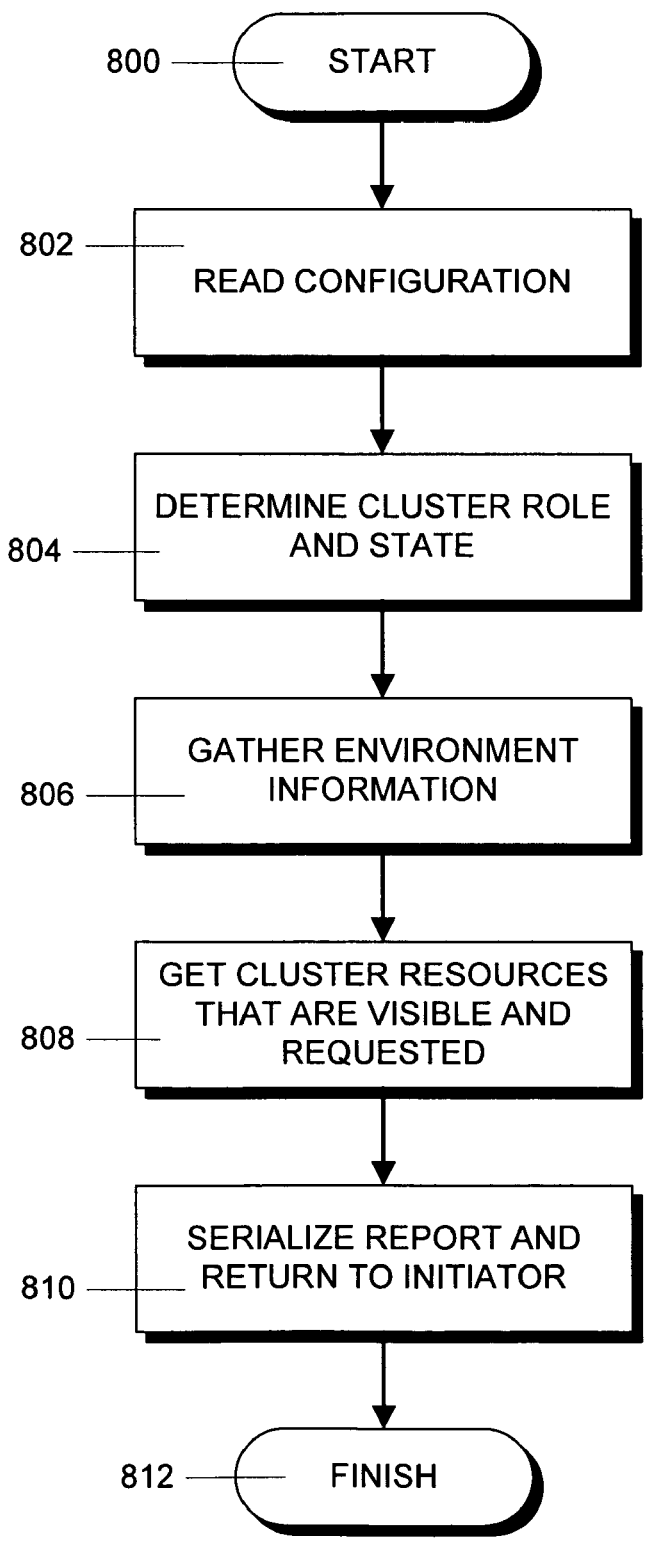
FIG. 8 is a flowchart that illustrates the steps performed by an agent that has been requested to provide resource information to another agent.

The process performed by the remote agent is set forth in the flowchart in FIG. 8. In providing the requested information, the remote agent performs a process that is very similar to that performed by the agent in the current cluster. In particular, the remote agent gathers cluster details, as set forth below and enters this information into the resource database associated with that other cluster. The requested information is then generated from that resource database. The process starts in step 800 and proceeds to step 802 where the remote agent reads a configuration file in order to configure itself in a manner similar to that discussed with respect to step 702. Next, in step 804, the remote agent determines the role, state and alias name of its associated cluster by interrogating the controlling node of the cluster using appropriate system calls and utilities as discussed above. This information is then entered into the resource database associated with the other cluster.

Then, in step 806, the remote agent gathers environment information, such as general cluster information, cluster alias name, the node host name and details, volume manager information, node count for the cluster and information concerning the other member nodes. When this information is obtained, it is entered into the resource database associated with that cluster as discussed above.

In step 808, the remote agent gathers information regarding the cluster resources that have been requested from the member systems of the other cluster. These resources include disks, file services, volumes and volume groups, service groups and their dependent resources and virtual servers. As each resource is located information is entered into the database for that cluster, either by updating existing information or by instantiating a new resource object from the appropriate resource sub-class.

Next, in step 810, the remote agent returns the entire contents of the remote database over the network to the initiating agent. The process then finishes in step 812. Returning to FIG. 7, in step 730, the remote database entries are entered into the resource database associated with the current cluster by determining whether an object corresponding to the resource already exists in the resource database and then calling either the mergeResources( ) method or the addResource( ) method of the resource database as described above.

At this point a complete set of resource objects for the cluster has been updated or instantiated. In step 732, an integrity check is performed to insure that the information in the database is consistent. Such a check might be performed by calling the checkIntegrity( ) method of the resource database. During such a check, for each resource that references dependent resource, the database is examined to determine whether a resource object exists for each referenced dependent resource. In particular, the resource type and resource ID of each dependent resource can be obtained from the resource list attribute of the containing resource object. Once a type and an ID have been obtained, the findResource( ) method of the resource database can be called to determine whether a corresponding resource object exists in the database. If the object does not exist, an error is returned. For example, if a file system object references a disk or volume that does not have a corresponding disk object or volume object in the database, then an error is returned.

Figure 9A:
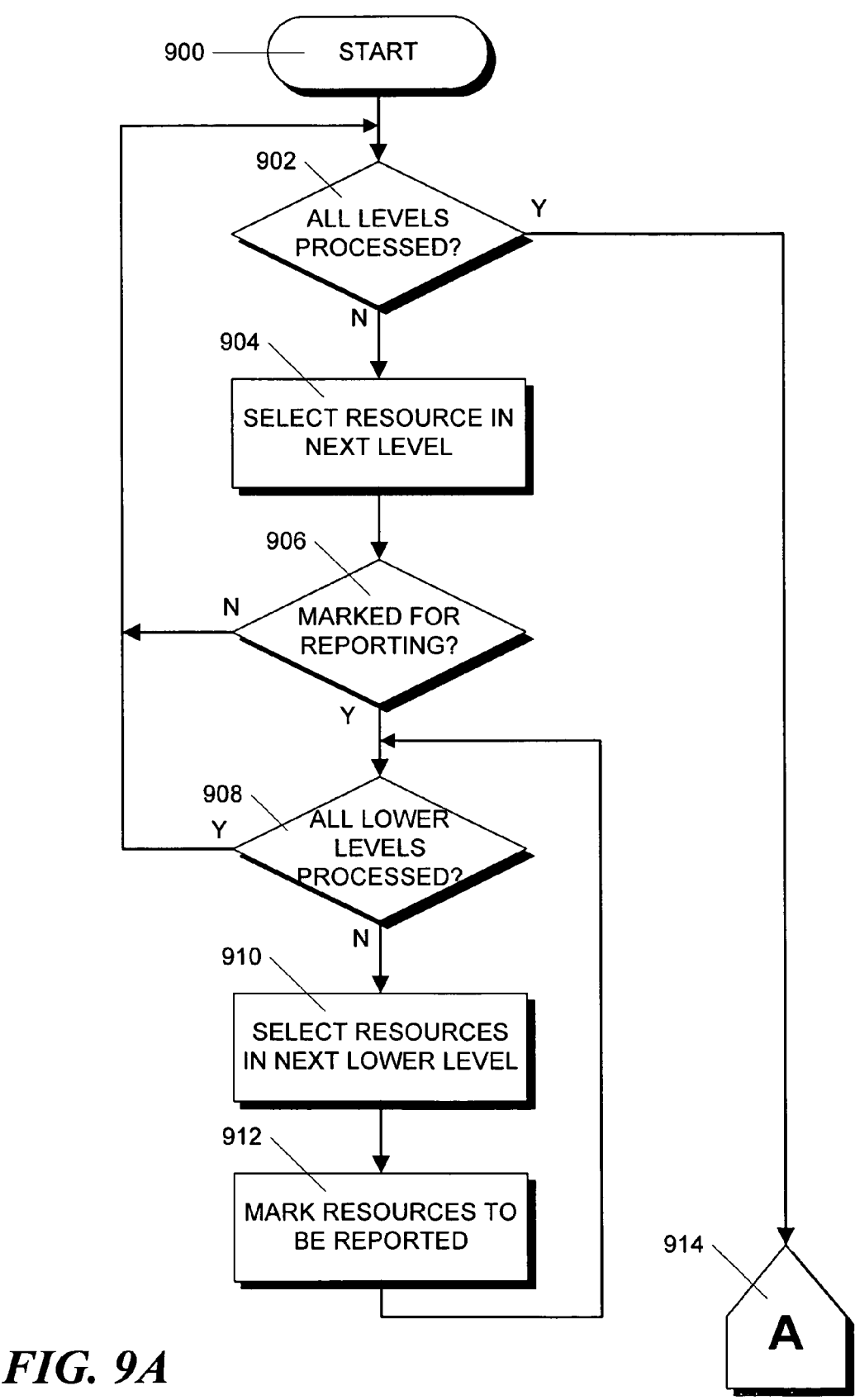
FIGS. 9A and 9B, when placed together, form a flowchart illustrating the steps performed during a process that resolves the reportability and integrity of resources marked for reporting, which process is run prior to generating reports.
Figure 9B:
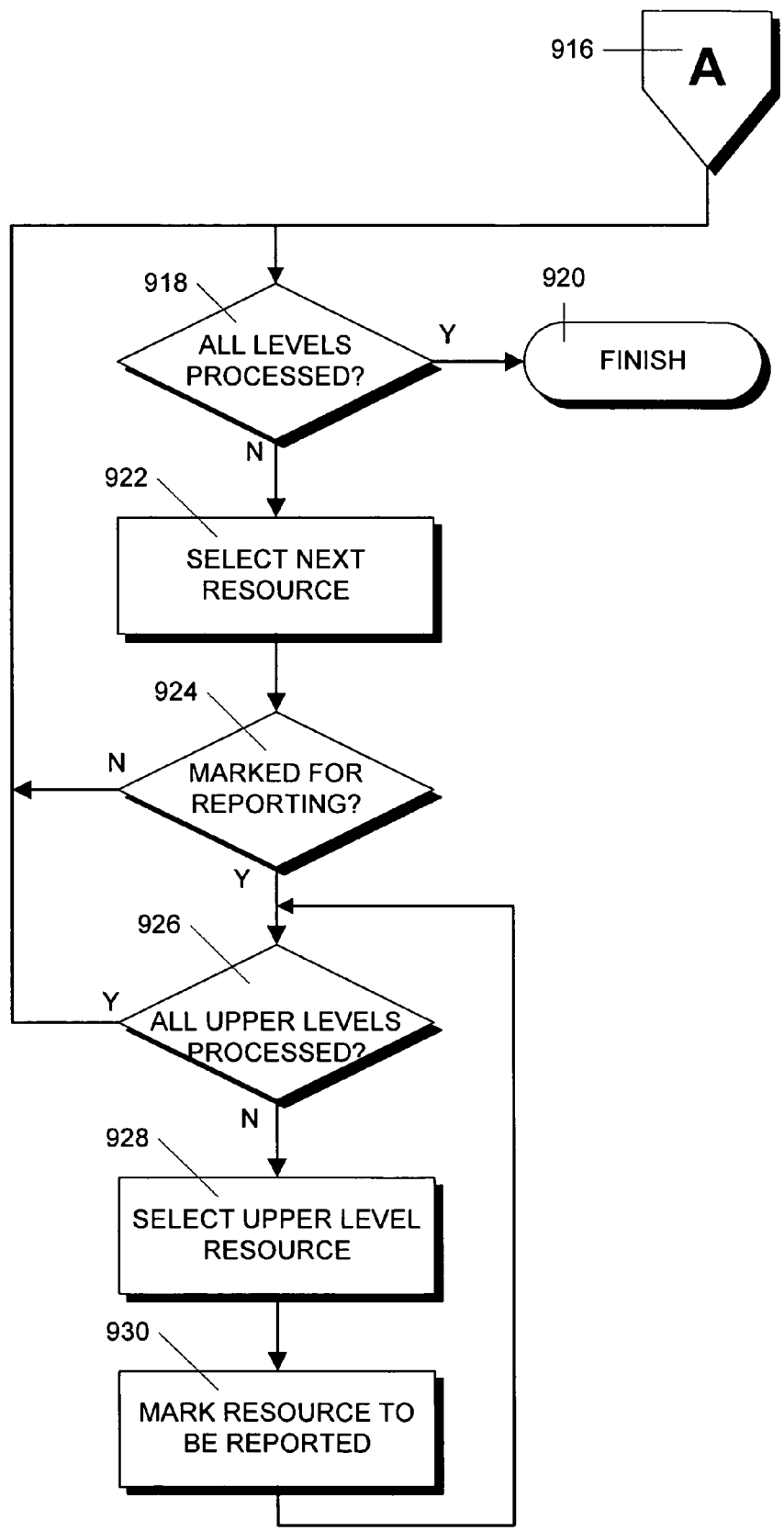

Next, in step 734, a check is made to determine whether the cluster state has changed. This is done in the manner described above. If the state has changed, the process proceeds to step 735 to generate an error and then finishes in step 740. Otherwise the process proceeds to step 736 in which the reportability and integrity of the resources is verified, for example by calling the resolveResources( ) method of the resource database. The operation of this method is illustrated by the flowchart shown in FIG. 9.

The verification process involves two passes over the resource information in the resource database. In the first pass, the resource hierarchy is checked from the upper levels down to the lower levels. In the second pass, the resource hierarchy is checked from the lower levels up to the upper levels. This process begins in step 900 and proceeds to step 902 where a determination is made whether all resource type levels that have resource objects, which may include dependent resource objects, have been processed. If not all such resource type levels have been processed, as determined in step 902, then the process proceeds to step 904, where resource objects in the next resource type level to be processed are sequentially selected. Then, in step 906, a further determination is made whether the selected resource object has been marked for reporting (in the manner discussed above.) If not, the process returns to step 902 to determine whether further resource type levels remain to be processed.

Alternatively, if in step 906, it is determined that the selected resource object has been marked for reporting, then, in step 908, a determination is made whether all lower levels that may contain dependent resource objects have been processed. This process is recursive in that each resource object and the resource objects referenced by it are checked. Then the referenced resource objects are checked to determine if they, in turn, reference further resource objects. If all lower levels have been processed, then, in step 910, resource objects in the next lower level are selected and, in step 912, marked for reporting (if the resource objects have not already been marked for reporting.) Operation continues in this manner until a determination is made in step 908 that all lower levels have been processed. When all lower levels have been processed, then the process returns back to step 902 to determine whether any upper levels remain to be processed.

When all upper levels have been processed, as determined in step 902, the first pass of the process is complete and the next pass is initiated. The second pass involves examining resources at lower resource type levels to determine whether the resources on which they are dependent are correctly marked for reporting. In particular, the process proceeds, via off-page connectors 914 and 916 to step 918 where a determination is made whether all lower levels have been processed. If not, then, in step 928, a lower level resource is selected. In step 924, a determination is made whether the selected resource has been marked for reporting. If not, the process returns back to step 918 to determine whether all lower levels have been processed.

If, in step 924, it is determined that the selected resource object has been marked for reporting, then, in step 926, a determination is made whether all upper levels that contain resources on which the selected resource may be dependent have been processed. If not, then in step 928, a resource on which the selected resource is dependent is selected. In step 930, the latter resource is marked to be reported (if it is not already marked.) The process then returns to step 926 to determine whether all upper levels have been processed. When all upper levels have been processed, then the process returns to step 918 to determine whether all lower levels have been processed. If so, the process is complete and ends in step 920.

Returning to FIG. 7, in step 738, a report is generated. Such a report can be generated by calling the generateReports( ) method of the ReportGenerator object. This method iterates over all resource objects in the resource database and generates a report if the resource has been marked for reporting. The cluster alias scan process then finishes in step 740.

Figure 10A:
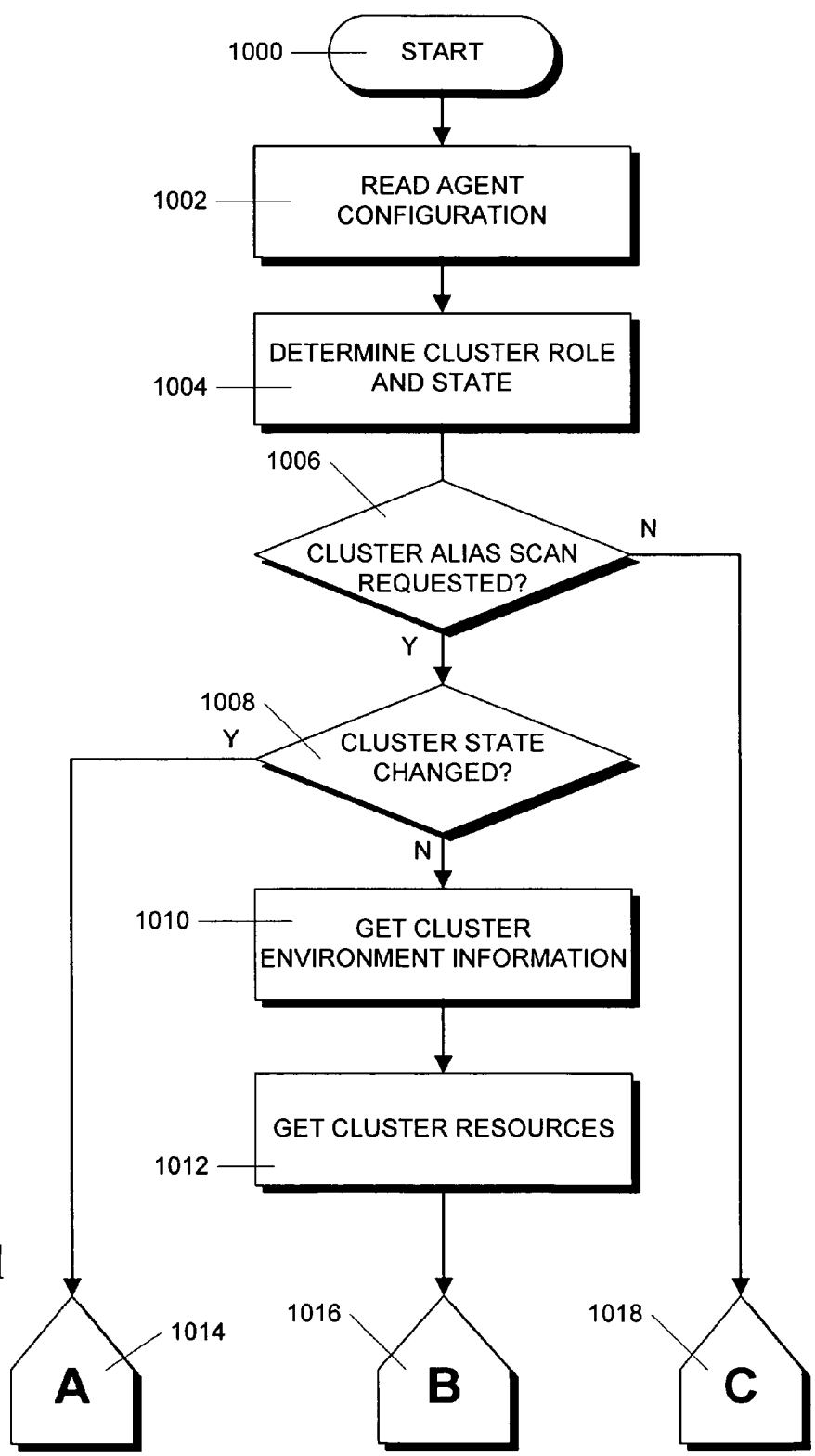
FIGS. 10A and 10B, when placed together, form a flowchart illustrating the steps performed by an agent during a cluster member scan that detects resources that are private to a cluster member.
Figure 10B:
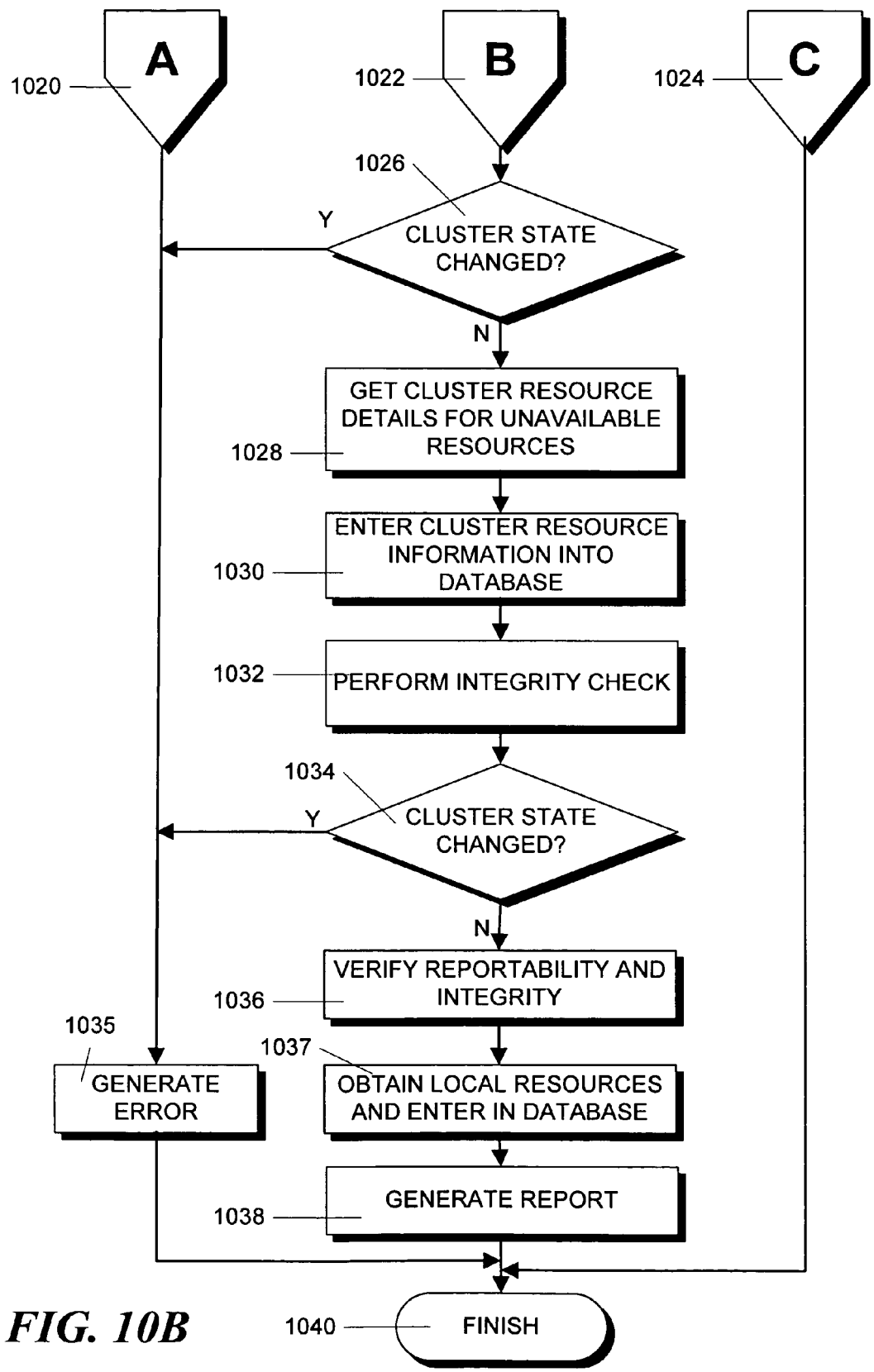

A process similar to that illustrated in FIGS. 7A and 7B is performed during a member scan in which resources that are private to the members of a cluster are reported. The member scan process is illustrated in FIGS. 10A and 10B. In FIGS. 10A and 10B, steps that are equivalent to steps in FIGS. 7A and 7B have been given equivalent numeral designations. For example, step 1002 illustrated in FIG. 10A corresponds to step 702 illustrated in FIG. 7A. Since the steps are equivalent, for clarity purposes the description will not be repeated. Although the cluster alias scan and the member scan both collect and identify resources that are shared between clusters, an important difference between the two scans is that, during a member scan, even though shared resources are collected and entered into the database, the corresponding resource objects are marked so that they are not included in the report. Thus, resource objects entered into the resource database in step 1030 would be marked so that the resources are not included in the report.

In addition, the process illustrated in FIGS. 10A and 10B, also includes an additional step 1037 in which resources local to each cluster member are collected by a suitable collector and entered into the resource database. The resource objects corresponding to these latter resources are marked to be reported.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different methods could be used for collecting and assigning resource IDs to resources. Other aspects, such as the specific process flow, as well as other modifications to the inventive concept are intended to be covered by the appended claims.

What is claimed is:

1. A method for generating upon request, a report of storage capacity in a data processing system that includes one or more storage resources, the method comprising:
   (a) providing the data processing system with a resource database for storing information for each storage resource wherein the storage resources are arranged in a hierarchy;
   (b) collecting storage resource information and capacity information on each storage resource and assigning a unique identifier to each storage resource;
   (c) entering information collected in step (b) into the resource database;
   (d) based on the request, marking individual resources for reporting;
   (e) checking information in the resource database for consistency;
   (f) generating the report by iterating over all information in the resource database that is marked for reporting and eliminating from the report any duplicate reporting of storage resources by identifying the duplicated storage resources based on the unique identifier assigned to each storage resource;
   (g) checking the resource database to determine whether a hierarchy level that is referred to by another hierarchy level exists in the resource database; and
   (h) generating an error when a hierarchy level that is referred to by another hierarchy level does not exist in the resource database.

2. The method of claim 1 wherein the storage resources are arranged in a hierarchy and wherein step (e) comprises marking for reporting storage resources that are lower in the hierarchy when a storage resource that is higher in the hierarchy has been marked for reporting.

3. The method of claim 1 wherein the storage resources are arranged in a hierarchy and wherein step (e) comprises marking for reporting storage resources that are higher in the hierarchy when a storage resource that is lower in the hierarchy has been marked for reporting.

4. The method of claim 1 wherein step (c) comprises:
   (c1) determining whether the storage resource information is already in the resource database;
   (c2) if the storage resource information is already in the resource database, updating the information; and
   (c3) if the storage resource information is not already in the resource database, adding the resource information to the resource database.

5. The method of claim 1 wherein the request indicates which of resources that are shared by the member systems and resources that are private to each member system should be reported, and wherein step (d) comprises marking individual resources for reporting based on the resources that are requested.

6. The method of claim 1 wherein the data processing system includes a plurality of collectors, each of which collects information on resources and wherein step (b) comprises activating each collector.

7. The method of claim 6 wherein step (b) comprises using each collector to assign each resource an identification.

8. A method for maintaining an accurate inventory of storage capacity in a data processing system that includes a first cluster with a plurality of member computer systems, each member system having one or more storage resources of various types, the method comprising:
(a) providing the first cluster with a resource database capable of containing a representation of each storage resource type;
(b) collecting storage resource information and capacity information from the member computer systems and assigning each resource an identification that is unique at least among resources of the same type; and
wherein step (b) comprises:
(b1) identifying second cluster resources which are available for use to the first cluster but for which detailed information is not available to the first cluster;
(b2) contacting the second cluster from the first cluster in order to collect information on resources identified in step (b1); and
(b3) sending the information collected in step (b2) from the second cluster to the first cluster;
(c) entering information collected in step (b) into the resource database;
(d) marking individual resources for reporting;
(e) after step (d) is complete, checking information in the database for reportability; and
(f) generating a report by iterating over all information in the resource database that is marked for reporting and eliminating from the report any duplicate reporting of storage resources by identifying the duplicated storage resources based on the unique identifier assigned to each storage resource.

9. The method of claim 8 wherein the storage resources are arranged in a hierarchy and wherein step (e) comprises marking for reporting storage resources that are lower in the hierarchy when a storage resource that is higher in the hierarchy has been marked for reporting.

10. The method of claim 8 wherein the storage resources are arranged in a hierarchy and wherein step (e) comprises marking for reporting storage resources that are higher in the hierarchy when a storage resource that is lower in the hierarchy has been marked for reporting.

11. The method of claim 8 wherein step (c) comprises:
(c1) determining whether the storage resource information is already in the resource database;
(c2) if the storage resource information is already in the resource database, updating the information; and
(c3) if the storage resource information is not already in the resource database, adding the resource information to the resource database.

12. The method of claim 8 wherein a scan request is received having a scan context indicating which of resources that are shared by the member systems and resources that are private to each member system should be reported, and wherein step (d) comprises marking individual resources for reporting based on the scan context.

13. The method of claim 8 wherein step (a) comprises providing the first cluster with an object-oriented resource database capable of containing an object representing each storage resource.

14. The method of claim 13 wherein step (c) comprises instantiating the object from a class that is dependent on the resource type.

15. The method of claim 8 wherein step (b2) comprises providing the second cluster with a second resource database, collecting storage resource information and capacity information from member computer systems in the second cluster and entering information collected into the second resource database.

16. The method of claim 15 wherein the first cluster is connected to the second cluster by a network and wherein step (b3) comprises sending the entire contents of the second resource database via the network to the first cluster.

17. The method of claim 8 wherein the data processing system includes a plurality of collectors, each of which collects information on resources of a specified resource type and wherein step (b) comprises activating each collector.

18. A method for maintaining an accurate inventory of storage capacity in a data processing system that includes a first cluster with a plurality of member computer systems, each member system having one or more storage resources of various types, the method comprising:
(a) providing the first cluster with a resource database capable of containing a representation of each storage resource type wherein the storage resources are arranged in a hierarchy;
(b) collecting storage resource information and capacity information from the member computer systems and assigning each resource an identification that is unique at least among resources of the same type; and
wherein step (b) comprises:
(b1) identifying second cluster resources which are available for use to the first cluster but for which detailed information is not available to the first cluster;
(b2) contacting the second cluster from the first cluster in order to collect information on resources identified in step (b1); and
(b3) sending the information collected in step (b2) from the second cluster to the first cluster;
(c) entering information collected in step (b) into the resource database:
(d) marking individual resources for reporting
(e) after step (d) is complete, checking information in the database for reportability; and
(f) generating a report by iterating over all information in the resource database that is marked for reporting and eliminating from the report any duplicate reporting of storage resources by identifying the duplicated storage resources based on the unique identifier assigned to each storage resource;
(g) checking the resource database to determine whether a hierarchy level that is referred to by another hierarchy level exists in the resource database; and
(h) generating an error when a hierarchy level that is referred to by another hierarchy level does not exist in the resource database.

19. Apparatus for generating upon request, a report of storage capacity in a data processing system that includes one or more storage resources, the apparatus comprising:
a resource database for storing information for each storage resource, wherein the storage resources are arranged in a hierarchy;

collectors that respond to the request by collecting storage resource information and capacity information on each storage resource and assign a unique identifier to each storage resource;

a mechanism that enters collected information into the resource database;

an agent that marks individual resources for reporting based on the request;

a mechanism that checks information in the resource database for consistency;

a report generator that generates the report by iterating over all information in the resource database that is marked for reporting and eliminating from the report any duplicate reporting of storage resources by identifying the duplicated storage resources based on the unique identifier assigned to each storage resource;

an integrity check mechanism that checks the resource database to determine whether a hierarchy level that is referred to by another hierarchy level exists in the resource database; and a mechanism that generates an error when a hierarchy level that is referred to by another hierarchy level does not exist in the resource database.

20. The apparatus of claim 19 wherein the storage resources are arranged in a hierarchy and wherein the mechanism for checking the resource database comprises a mechanism that marks for reporting storage resources that are lower in the hierarchy when a storage resource that is higher in the hierarchy has been marked for reporting.

21. The apparatus of claim 19 wherein the storage resources are arranged in a hierarchy and wherein the mechanism for checking the resource database comprises a mechanism that marks for reporting storage resources that are higher in the hierarchy when a storage resource that is lower in the hierarchy has been marked for reporting.

22. The apparatus of claim 19 wherein the mechanism for entering information into the database comprises:
a mechanism that determines whether the storage resource information is already in the resource database;
a mechanism operable when the storage resource information is already in the resource database, that updates the information; and
a mechanism operable when the storage resource information is not already in the resource database, which adds the resource information to the resource database.

23. The apparatus of claim 19 wherein the request indicates which of resources that are shared by the member systems and resources that are private to each member system should be reported, and wherein the agent comprises a mechanism that marks individual resources for reporting based on the resources that are requested.

24. The apparatus of claim 19 further including a plurality of collectors, each of which collects information on resources.

25. Apparatus for maintaining an accurate inventory of storage capacity in a data processing system that includes a first cluster with a plurality of member computer systems, each member system having one or more storage resources of various types, the apparatus comprising:
a resource database capable of containing a representation of each storage resource type;
means for collecting storage resource information and capacity information from the member computer systems and for assigning each resource an identification that is unique at least among resources of the same type;
means for entering collected information into the resource database;
means for marking individual resources for reporting;
means for checking information in the database for reportability;
means for generating a report by iterating over all information in the resource database that is marked for reporting and for eliminating from the report any duplicate reporting of storage resources by identifying the duplicated storage resources based on the unique identifier assigned to each storage resource;
means for identifying second cluster resources which are available for use to the first cluster but for which detailed information is not available to the first cluster;
means for contacting the second cluster from the first cluster in order to collect information on identified resources; and
means for sending the information collected on identified resources from the second cluster to the first cluster.

26. The apparatus of claim 25 wherein the storage resources are arranged in a hierarchy and wherein the checking means comprises means for marking for reporting storage resources that are lower in the hierarchy when a storage resource that is higher in the hierarchy has been marked for reporting.

27. The apparatus of claim 25 wherein the storage resources are arranged in a hierarchy and wherein the checking means comprises means for marking for reporting storage resources that are higher in the hierarchy when a storage resource that is lower in the hierarchy has been marked for reporting.

28. The apparatus of claim 25 wherein the entering means comprises:
means for determining whether the storage resource information is already in the resource database;
means operable when the storage resource information is already in the resource database, updating the information; and
means operable when the storage resource information is not already in the resource database, adding the resource information to the resource database.

29. The apparatus of claim 25 wherein a scan request is received having a scan context indicating which of resources that are shared by the member systems and resources that are private to each member system should be reported, and wherein the marking means comprises means for marking individual resources for reporting based on the scan context.

30. The apparatus of claim 25 wherein the resource database comprises an object oriented resource database capable of containing an object representing each storage resource.

31. The apparatus of claim 30 further comprises means for instantiating each object from a class that is dependent on the resource type.

32. The apparatus of claim 25 wherein the second cluster comprises a second resource database, and wherein the contacting means comprises means for collecting storage resource information and capacity information from member computer systems in the second cluster and means for entering information collected into the second resource database.

33. The apparatus of claim 25 wherein the first cluster is connected to the second cluster by a network and wherein the means for sending the information comprises means for sending the entire contents of the second resource database via the network to the first cluster.

34. The apparatus of claim 25 wherein the data processing system includes a plurality of collectors, each of which collects information on resources of a specified resource type and wherein the collecting means comprises means for activating each collector.

35. Apparatus for maintaining an accurate inventory of storage capacity in a data processing system that includes a first cluster with a plurality of member computer systems, each member system having one or more storage resources of various types, the apparatus comprising:
- a resource database capable of containing a representation of each storage resource type, wherein the storage resources are arranged in a hierarchy;
- means for collecting storage resource information and capacity information from the member computer systems and for assigning each resource an identification that is unique at least among resources of the same type;
- means for entering collected information into the resource database;
- means for marking individual resources for reporting;
- means for checking information in the database for reportability;
- means for generating a report by iterating over all information in the resource database that is marked for reporting and for eliminating from the report any duplicate reporting of storage resources by identifying the duplicated storage resources based on the unique identifier assigned to each storage resource;
- means for identifying second cluster resources which are available for use to the first cluster but for which detailed information is not available to the first cluster;
- means for contacting the second cluster from the first cluster in order to collect information on identified resources;
- means for sending the information collected on identified resources from the second cluster to the first cluster;
- means for checking the resource database to determine whether a hierarchy level that is referred to by another hierarchy level exists in the resource database; and
- means for generating an error when a hierarchy level that is referred to by another hierarchy level does not exist in the resource database.

36. A computer program product for maintaining an accurate inventory of storage capacity in a data processing system that includes a first cluster with a plurality of member computer systems, each member system having one or more storage resources of various types, the computer program product comprising a computer usable medium having computer readable program code thereon including:
- program code for creating a resource database capable of containing a representation of each storage resource type;
- program code for collecting storage resource information and capacity information from the member computer systems and for assigning each resource an identification that is unique at least among resources of the same type;
- program code for entering collected information into the resource database;
- program code for marking individual resources for reporting;
- program code for checking information in the database for reportability; and
- program code for generating a report by iterating over all information in the resource database that is marked for reporting and eliminating from the report any duplicate reporting of storage resources by identifying the duplicated storage resources based on the unique identifier assigned to each storage resource; and
- wherein the data processing system further includes a second cluster with a plurality of resources and wherein the collecting means comprises:
- program code for identifying second cluster resources which are available for use to the first cluster but for which detailed information is not available to the first cluster;
- program code for contacting the second cluster from the first cluster in order to collect information on identified resources; and
- program code for sending the information collected on identified resources from the second cluster to the first cluster.

37. The computer program product of claim 36 wherein the storage resources are arranged in a hierarchy and wherein the program code for checking information in the database comprises program code for marking for reporting storage resources that are lower in the hierarchy when a storage resource that is higher in the hierarchy has been marked for reporting.

38. The computer program product of claim 36 wherein the storage resources are arranged in a hierarchy and wherein the program code for checking information in the database comprises program code for marking for reporting storage resources that are higher in the hierarchy when a storage resource that is lower in the hierarchy has been marked for reporting.

* * * * *